Figure 1:
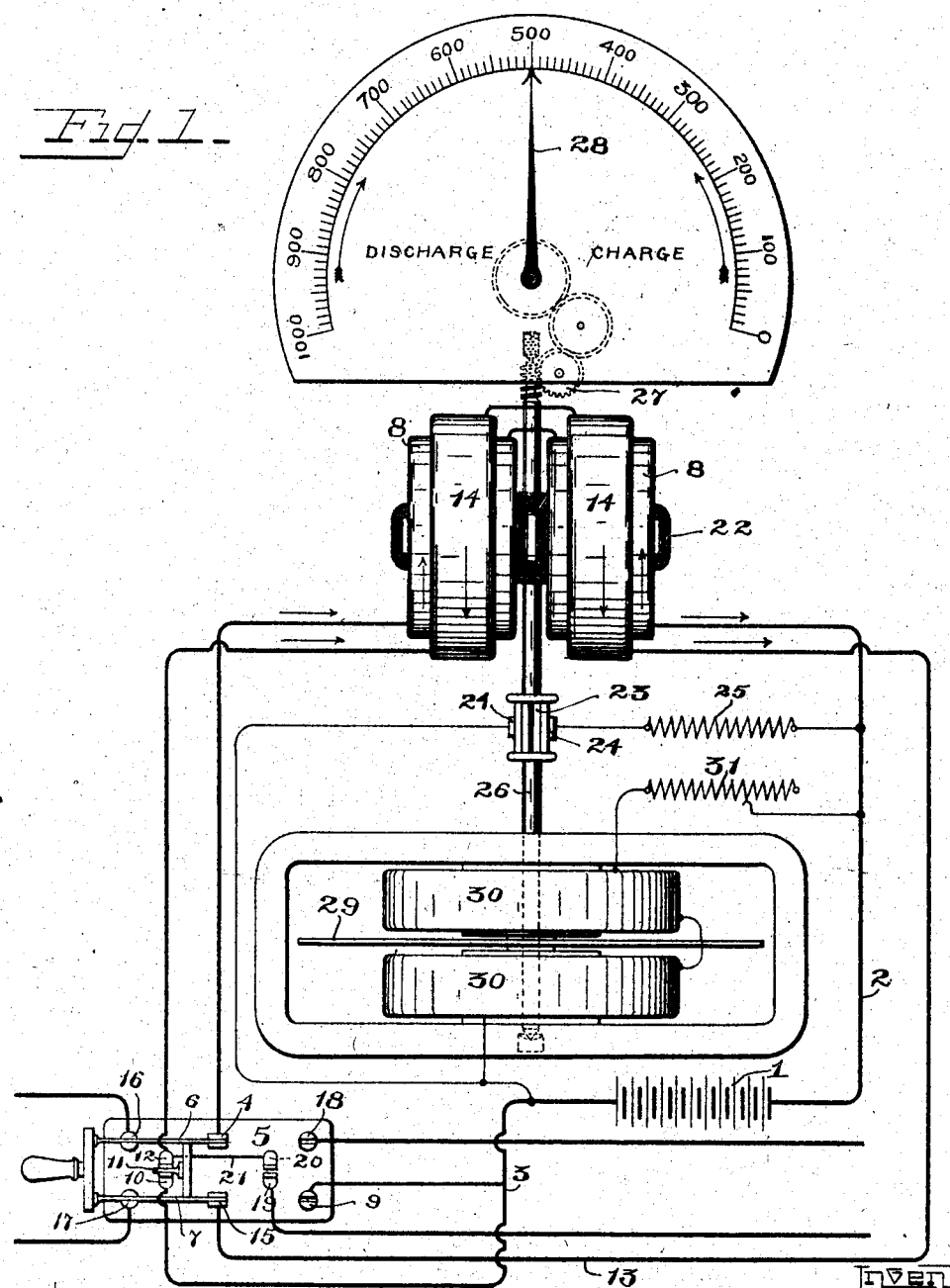

No. 796,043. PATENTED AUG. 1, 1905.
T. DUNCAN.
ELECTRIC METER.
APPLICATION FILED JULY 18, 1901.

2 SHEETS—SHEET 1.

Witnesses
Max W. Zabel.
Harvey L. Hanson.

Inventor
Thomas Duncan.
By Charles A. Brown Cragg & Offield
Attorneys

No. 796,043. PATENTED AUG. 1, 1905.
T. DUNCAN.
ELECTRIC METER.
APPLICATION FILED JULY 18, 1901.

2 SHEETS—SHEET 2.

WITNESSES:

INVENTOR.
Thomas Duncan
By Charles A. Brown Cragg & Belfield
ATTORNEYS.

UNITED STATES PATENT OFFICE.

THOMAS DUNCAN, OF CHICAGO, ILLINOIS.

ELECTRIC METER.

No. 796,043.  Specification of Letters Patent.  Patented Aug. 1, 1905.

Application filed July 18, 1901. Serial No. 68,758.

*To all whom it may concern:*

Be it known that I, THOMAS DUNCAN, a citizen of the United States, residing at Chicago, in the county of Cook and State of Illinois, have invented a certain new and useful Improvement in Electric Meters, of which the following is a full, clear, concise, and exact description, reference being had to the accompanying drawings, forming a part of this specification.

My invention relates to storage-battery meters, and has for its object the provision of improved means whereby the meter may operate at one rate per unit of load or energy while the battery is being charged, and at an increased rate per unit of load or energy while the battery is discharging, to compensate for battery loss. For this purpose the rotating element of the meter is subject to the field of a meter-winding that is preferably especially provided to modify the speed thereof per unit of load or energy, as required. This meter-winding is preferably in the form of an auxiliary field-winding, producing an adjusting torque to effect the result, whereby the effective torque of the meter is properly modified.

I preferably practice my invention with a meter having two current field-windings in combination with switching mechanism, preferably constituting a part of that mechanism controlling the connection of the battery with the charging-machine and the translating means, whereby the current through one of the current-windings may be reversed each time the connection of the battery is changed from the translating means to the charging-machine, or vice versa. The arrangement is such that when the storage battery is being charged current through these current field-windings will flow in opposite directions, whereby opposing fields are produced, causing a reduction in the torque of the meter during the connection of the battery with the charging-machine. When the battery is connected with the translating means, the current through the field-windings is caused to flow in the same direction, so that the torque of the meter will be increased while the battery is discharging.

The rotating element of the meter may be provided with a pressure-winding connected in bridge between the leads from the battery, and the meter may be caused to measure in units of watts or ampere-hours, as desired.

I will explain my invention more fully by reference to the accompanying drawings, in which—

Figure 2:
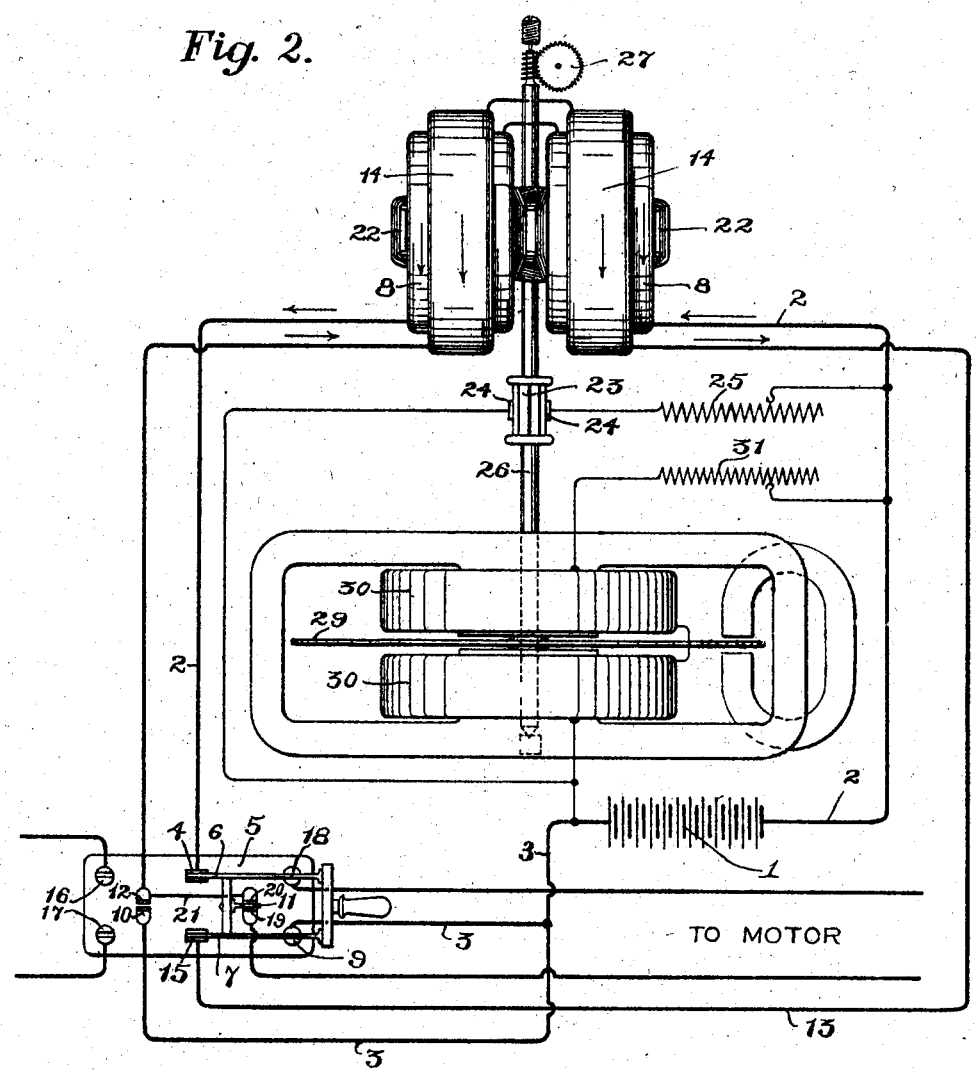

Figure 1 diagrammatically illustrates a meter of my invention coöperatively associated with a storage battery, and a switching mechanism for controlling the circuit relation of the storage battery with the translating means supplied thereby, and the machine for charging the same. Fig. 2 is a view similar to Fig. 1, the reading-dial being removed and the switching mechanism being shown in an alternative position.

Like parts are indicated by similar characters of reference in both views.

A storage battery 1 is included in circuit with its mains 2 and 3, the main 2 extending to one of the pivotal mountings 4 of a switch 5, having blades 6 and 7, the blade 6 being provided with the mounting 4. The main 2 includes one of the current field-windings 8 of the meter. The main 3 is provided with two terminal connections at the switch 5, connection 9 upon the right of the switch-mounting and connection 10 upon the left thereof. The switch 5 has a supplemental contact-blade 11, adapted to electrically connect the contacts 10 and 12 when the switch is thrown to the left, as indicated in Fig. 1, whereby the main 3 is connected with the conductor 13, leading to the remaining current field-winding 14 of the meter, this winding being connected with the remaining pivotal mounting 15 of the switch, the contact-blade 7 being directly supported upon this mounting. In the position of the switch illustrated the terminals 16 and 17 of a charging-machine circuit are through the instrumentality of the engaging blades 6 and 7 connected with the storage battery for the purpose of charging the same, current passing to the battery flowing through the coöperating current field-coils 8 and 14 in a direction indicated by the arrows, the windings 8 and 14 being so disposed that current will flow through the same in opposite directions to reduce the resultant current-field, and thereby effect a reduction in the torque of the meter. When the switch is thrown to the right, the blade 6 connects the terminal 18 of the circuit leading to the translating means, as the motor of a motor-vehicle, with the storage-battery main 2, while the blade 7 connects the terminal 9 of the storage-battery main 3 with the conductor 13. The remaining terminal 19 of the circuit leading to the translating means is connected with the supplemental terminal 20 of the conductor 13 by the supplemental blade 11, as indicated in Fig. 2, the said terminal 20 being connected with the terminal 12 by means of the conductor 21.

By means of the supplemental switch-blade 11 and the contacts 10, 12, 19, and 20 the current through the winding 14 is maintained in uniform direction irrespective of the association of the storage battery with the translating means or the charging-machine. The current through the winding 8, however, is reversed in direction each time the switch 5 is moved from one of its alternative positions to the other. When the charging-machine is in circuit, as illustrated in Fig. 1, the current through the windings 8 and 14 flows in the direction indicated by two arrows. The windings, however, are reversed with respect to each other, so that the current flows through the same in opposite directions to decrease the field jointly due to the windings to cause a reduced rate of operation per unit of load or energy while the battery is being charged. When the charging-machine is cut out of circuit and the translating means cut in circuit with the battery, as indicated in Fig. 2, the current-flow through the winding 8 is changed in direction, as indicated by the arrow, the current in the windings, however, flowing in the same direction to increase the field jointly due to the current-windings, to thereby increase the torque of the meter to compensate for battery loss. The meter is in this instance adapted to register in units of ampere-hours and is provided with an armature 22, connected between the battery-mains and having a commutator 23, which by engagement with the brushes 24 24 includes the said armature-winding in circuit. A choking resistance 25 may be included in circuit with the armature to reduce the current-flow. The armature is mounted upon a spindle 26, which operates a wheel-train 27 to actuate an index 28, which in this instance is shown adapted for rotation in opposite directions, in one direction while the battery is being charged and in the other direction while the battery is discharging. The spindle supports a damping-disk 29, that may be arranged within the field of an electromagnet 30, whose winding is included in a bridge independent of that including the armature, a choking resistance 31 being included in circuit with the winding of the magnet 30 to prevent an undue flow of current.

While I have herein shown and particularly described the preferred embodiment of my invention, it is obvious that changes may readily be made without departing from the spirit thereof, and I do not, therefore, wish to be limited to the precise disclosure herein set forth; but,

Having thus described my invention, I claim as new and desire to secure by Letters Patent—

1. The combination with a storage battery, of switching mechanism for connecting the same with translating means to be supplied thereby or a charging-machine, a meter receiving current passing through the storage battery, the said meter having two windings for jointly producing a field, and means whereby the said windings may be caused to coöperate to produce opposing fields when the battery is connected with the charging-machine, whereby the torque of the meter is reduced when the battery is connected with the charging-machine and permitted to increase when the battery is connected with the translating means, to compensate for battery loss, substantially as described.

2. The combination with a storage battery, of switching mechanism for connecting the same with the translating means to be supplied thereby or a charging-machine, a meter receiving current passing through the storage battery, the said meter having two windings for jointly producing a field, and switching mechanism operated when the battery is connected with the charging-machine to cause the said meter-windings to act oppositely to decrease the torque of the meter, said switching means also serving to cause the said windings to act jointly to produce an increased field and thereby an increased torque when the battery is connected with the translating means, to compensate for battery loss, substantially as described.

3. The combination with a storage battery, of switching mechanism for connecting the same with the translating means to be supplied thereby or a charging-machine, a meter receiving current passing through the storage battery, the said meter having two windings for jointly producing a field, and means whereby the said windings may be caused to coöperate to produce an increased field when the storage battery is connected with the translating means to compensate for battery loss, the said windings being current-windings included in series with the battery, the rotating element of the meter having an armature-winding carried thereby connected in circuit with the battery, substantially as described.

4. The combination with a storage battery, of switching mechanism for connecting the same with the translating means to be supplied thereby or a charging-machine, a meter receiving current passing through the storage battery, the said meter having two windings for jointly producing a field, and means whereby the said windings may be caused to coöperate to produce opposing fields when the battery is connected with the charging - machine, whereby the torque of the meter is reduced when the battery is connected with the charging-machine, and permitted to increase when the battery is connected with the translating means to compensate for battery loss, the said windings being current-windings included in series with the battery, the rotating element of the meter having an armature-winding carried thereby connected in circuit with the battery, substantially as described.

5. The combination with a storage battery, of switching mechanism for connecting the same with the translating means to be supplied thereby or a charging-machine, a meter receiving current passing through the storage battery, the said meter having two windings for jointly producing a field, and switching mechanism operated when the battery is connected with the charging-machine to cause the said meter-windings to act oppositely to decrease the torque of the meter, said switching means also serving to cause the said windings to act jointly to produce an increased field and thereby an increased torque when the battery is connected with the translating means, to compensate for battery loss, the said windings being current-windings included in series with the battery, the rotating element of the meter having an armature-winding carried thereby connected in circuit with the battery, substantially as described.

6. The combination with a storage battery, of switching mechanism for connecting the same with the translating means to be supplied thereby or a charging-machine, a meter receiving current passing through the storage battery, the said meter having two windings for jointly producing a field, and means whereby the said windings may be caused to coöperate to produce a decreased field when the storage battery is connected with the charging-machine, substantially as described.

7. The combination with a storage battery, of switching mechanism for connecting the same with the translating means to be supplied thereby or a charging-machine, a meter receiving current passing through the storage battery, means for adjusting the meter-winding to modify the rate of operation of the meter per unit of load or energy upon changing the connection of the battery from the translating means to a charging-machine or vice versa to compensate for battery loss, a damping-disk, and an electromagnetic damping-magnet within whose field said disk is adapted to rotate, the terminals of said electromagnetic damping-magnet being connected in bridge of said storage battery, substantially as described.

8. The combination with a storage battery, of switching mechanism for connecting the same with the translating means to be supplied thereby or a charging-machine, a meter receiving current passing through the storage battery, means for varying the amount of torque of the meter per unit of load or energy upon changing the connection of the battery from the translating means to a charging means or vice versa to compensate for battery loss, a damping-disk, and an electromagnetic damping-magnet within whose field said disk is adapted to rotate, the terminals of said electromagnetic damping-magnet being connected in bridge of said storage battery, substantially as described.

9. The combination with a storage battery, of switching mechanism for connecting the same with the translating means to be supplied thereby or a charging-machine, a meter receiving current passing through the storage battery, means for adjusting the meter-winding to modify the rate of operation of the meter per unit of load or energy upon changing the connection of the battery from the translating means to a charging-machine or vice versa to compensate for battery loss, a damping-disk, and an electromagnetic damping-magnet within whose field said disk is adapted to rotate, the terminals of said electromagnetic damping-magnet being connected in bridge of said storage battery, substantially as described.

10. The combination with a storage battery, of switching mechanism for connecting the same with the translating means to be supplied thereby or a charging-machine, a meter receiving current passing through the storage battery, means for varying the amount of torque of the meter per unit of load or energy upon changing the connection of the battery from the translating means to a charging means or vice versa to compensate for battery loss, a damping-disk, and an electromagnetic damping-magnet within whose field said disk is adapted to rotate, the terminals of said electromagnetic damping-magnet being connected in bridge of said storage battery, substantially as described.

11. The combination with a circuit in which current may pass in either one direction or the other, of a meter receiving current passing through said circuit, the said meter having two windings for jointly producing a field, and means whereby the said windings may be caused to coöperate to produce opposing fields when the current flows in one direction through the circuit, whereby the torque of the meter is reduced, and whereby said windings may be caused to produce a cumulative field when the current in the circuit flows in the opposite direction, whereby the torque of the meter is increased, substantially as described.

12. The combination with a storage battery, of switching mechanism for connecting the same with the translating means to be supplied thereby or a charging-machine, a meter receiving current passing through the storage battery, a torque-producing field-winding and means whereby the field-winding may modify the rate of operation of the meter per unit of load or energy, upon changing the connection of the battery from the translating means to a charging-machine or vice versa, to compensate for battery loss, substantially as described.

13. The combination with a storage battery, of switching mechanism for connecting the same with the translating means to be supplied thereby or a charging-machine, a meter receiving current passing through the storage battery, a torque-producing field-winding, and means whereby the field-winding may vary the amount of torque of the meter per unit of load or energy upon changing the connection of the battery from the translating means to a charging-machine or vice versa, to compensate for a battery loss, substantially as described.

14. The combination with a storage battery, of switching mechanism for connecting the same with the translating means to be supplied thereby or a charging-machine, a meter receiving current passing through the storage battery, a torque-producing current field-winding and means whereby the field-winding may modify the rate of operation of the meter per unit of load or energy, upon changing the connection of the battery from the translating means to a charging-machine or vice versa, to compensate for battery loss, substantially as described.

In witness whereof I hereunto subscribe my name this 27th day of June, A. D. 1901.

THOMAS DUNCAN.

Witnesses:
GEORGE L. CRAGG,
HARVEY L. HANSON.